(12) United States Patent
Shiroma et al.

(10) Patent No.: US 11,772,167 B2
(45) Date of Patent: Oct. 3, 2023

(54) CUTTING INSERT

(71) Applicant: TUNGALOY CORPORATION, Fukushima (JP)

(72) Inventors: Hikaru Shiroma, Iwaki (JP); Satoru Yoshida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/579,677

(22) Filed: Jan. 20, 2022

(65) Prior Publication Data

US 2022/0250164 A1    Aug. 11, 2022

(30) Foreign Application Priority Data

Feb. 10, 2021 (JP) ................................. 2021-019452

(51) Int. Cl.
*B23C 5/10* (2006.01)
*B23C 5/20* (2006.01)
*B23B 27/16* (2006.01)

(52) U.S. Cl.
CPC .......... *B23B 27/1611* (2013.01); *B23C 5/109* (2013.01); *B23C 2200/0433* (2013.01); *B23C 2200/367* (2013.01)

(58) Field of Classification Search
CPC ...... B23C 2200/0494; B23C 2200/286; B23C 2200/367; B23C 5/109; B23C 5/202; B23C 2200/0433; B23B 27/1611
See application file for complete search history.

(56) References Cited

U.S. PATENT DOCUMENTS

| 5,853,267 | A |  | 12/1998 | Satran et al. |
| 6,227,772 | B1 | * | 5/2001 | Heinloth ................. B23C 5/202 407/115 |
| 7,241,082 | B2 | * | 7/2007 | Smilovici ............. B23C 5/2213 407/115 |
| 9,205,499 | B2 | * | 12/2015 | Morrison ................ B23C 5/202 |

(Continued)

FOREIGN PATENT DOCUMENTS

| JP | 2000-516152 A | 12/2000 |
| JP | 2006-021319 A | 1/2006 |

(Continued)

*Primary Examiner* — Sara Addisu
(74) *Attorney, Agent, or Firm* — Studebaker & Brackett PC

(57) ABSTRACT

To provide a cutting insert that is properly manufactured with ease of use. A cutting insert has a first end face, a second end face on the opposite side from the first end face, and a peripheral side surface that is parallel to a central axis connecting the center of the first end face and the center of the second end face and connects the first end face and the second end face. A first major cutting edge is formed on the outer edge of the first end face. A first flank facing the first major cutting edge is formed between the first major cutting edge and the peripheral side surface and has a negative clearance angle α with respect to the peripheral side surface. The peripheral side surface includes a first side surface facing the first flank. Between the first flank and the first side surface, a recess line is formed to extend along a virtual edge line where a virtual plane extending from the first flank and a virtual plane extending from the first side surface cross each other, and the recess line is formed with a notch on the virtual edge line.

16 Claims, 6 Drawing Sheets

(56) References Cited

U.S. PATENT DOCUMENTS

| | | | |
|---|---|---|---|
| 9,925,596 B2* | 3/2018 | Johansson | B23B 27/10 |
| 10,799,961 B2* | 10/2020 | Kitajima | B23C 5/109 |
| 2004/0013478 A1* | 1/2004 | Dehn | B23C 5/22 |
| | | | 407/113 |
| 2006/0019120 A1 | 1/2006 | Jonsson | |
| 2009/0047078 A1* | 2/2009 | Kirchberger | B23C 3/06 |
| | | | 407/114 |
| 2016/0167137 A1* | 6/2016 | Agic | B23B 27/1662 |
| | | | 407/66 |
| 2018/0257155 A1 | 9/2018 | Kitajima et al. | |
| 2018/0304382 A1 | 10/2018 | Hecht | |
| 2019/0240746 A1 | 8/2019 | Kitajima et al. | |
| 2022/0250174 A1* | 8/2022 | Shiroma | B23C 5/202 |

FOREIGN PATENT DOCUMENTS

| | | | | |
|---|---|---|---|---|
| JP | 2014-046444 A | | 3/2014 | |
| JP | 2017056552 A | * | 3/2017 | B23C 5/10 |
| JP | 6424975 B1 | | 11/2018 | |
| WO | WO-03101654 A1 | * | 12/2003 | B23C 5/109 |
| WO | 2017/047700 A1 | | 3/2017 | |

* cited by examiner

CUTTING INSERT

CROSS-REFERENCES TO RELATED APPLICATIONS

This application relates to and claims priority from Japanese Patent Application No. 2021-019452, filed on Feb. 10, 2021, the entire disclosure of which is incorporated herein by reference.

BACKGROUND

Field

The present invention relates to a cutting insert.

Description of Related Art

The cutting insert has a restraint surface from which the cutting insert fixed on a tool body is in contact with the insert mount of the tool body. If the cutting insert is configured as a vertical insert, a side surface immediately under the flank of a major cutting edge serves as a main restraint surface. In an inverted positive type where a tip clearance has a negative angle, a crossing angle between the flank of a cutting edge and a side surface immediately under the flank is small (for example, Japanese Patent No. 6424975).

SUMMARY

If a crossing angle between two side surface surfaces is small, the edge line of the two crossing side surface surfaces is gentle and less visible. As a result of wearing of the cutting edge of the cutting edge after repeated cutting, for example, the cutting edge may be chipped or boundary wear may occur on a cutting face or a flank in the cut portion of the cutting edge. If an edge line formed by the flank of the cutting edge and the side surface immediately under the flank is less visible, wear reaching the side surface over the edge line is less noticeable. If the surface of a side surface is roughened by wear, the restrained state of the cutting insert may become unstable when a new major cutting edge is used while the side surface serves as a restraint surface.

Moreover, if a crossing angle between the two side surfaces is small, the position of the edge line may be largely moved when any one of the side surfaces is slightly displaced. In order to remove a sintered skin and secure contact with the insert mount, the restraint surface may be ground. If the grinding amount of the restraint surface is slightly smaller than a predetermined value, the area of the restraint surface may be reduced and the restrained state of the cutting insert may become unstable. If the grinding amount of the restraint surface is slightly larger than the predetermined value, the flank may be reduced according to the extension of the restraint surface. In order to adjust both of the restraint surface and the flank to proper sizes, the tolerance of the grinding amount needs strict management, leading to difficulty in manufacturing the cutting insert.

An object of the present invention is to provide a cutting insert properly manufactured with ease of use.

A cutting insert according to an aspect of the present invention has a first end face, a second end face on the opposite side from the first end face, and a peripheral side surface that is parallel to a central axis connecting the center of the first end face and the center of the second end face and connects the first end face and the second end face. A first major cutting edge is formed on the outer edge of the first end face. A first flank facing the first major cutting edge is formed between the first major cutting edge and the peripheral side surface and has a negative clearance angle with respect to the peripheral side surface. The peripheral side surface includes a first side surface facing the first flank. A recess line is formed between the first flank and the first side surface, the recess line extending along a virtual edge line where a virtual plane extending from the first flank and a virtual plane extending from the first side surface cross each other, the recess line being formed with a notch on the virtual edge line.

According to the aspect, the recess line defines the outline of the first side surface. Thus, when a cutting edge is chipped by repeated cutting or boundary wear occurs on a cutting face or a flank in the cut portion of the cutting edge, the wear approaching the first side surface can be visualized. This can visually identify the timing to change the corners of the cutting insert and replace cutting edges, ensuring the ease of use for an operator. In the case of grinding on the first side surface, the area of the first side surface is stabilized without strict management of the tolerance of a grinding amount, thereby properly manufacturing the cutting insert.

In the aspect, the cutting insert is configured as a vertical insert. The first end face has point symmetry being symmetrically at 180° around the central axis and has a second major cutting edge on the outer edge of the first end face, the second major cutting edge being opposed to the first major cutting edge. The first side surface may be brought into contact with a tool body during cutting with the second major cutting edge.

According to the aspect, the recess line defines the outline of the first side surface and stabilizes the area of the first side surface. Thus, when the cutting insert is reversed by 180° (the corners are changed) to use the first side surface as a main restraint surface in order to use the second major cutting edge, the restrained state of the cutting insert is stabilized.

In the foregoing aspect, the first side surface may be ground.

According to the aspect, a sintered skin is removed and the smoothed restraint surface comes into contact with an insert mount, thereby stabilizing the restraint state of the cutting insert. Even if a large cutting resistance is applied, the cutting insert hardly rattles. In the present invention, even if the first side surface is slightly displaced, the first side surface is not resized, allowing grinding on the first side surface.

In the foregoing aspect, the first flank may decrease in width from both ends of the first major cutting edge toward the center of the first major cutting edge.

According to the aspect, even if the flank of the cutting insert varies in width among parts, the outline of the first flank is defined by the recess line, thereby accurately forming the flank with a desired width. The width of the flank can be optimized for each of the parts.

In the foregoing aspect, the first end face may have a substantially rectangular outer edge, the first major cutting edge may be located on a long side of the first end face, a first corner cutting edge adjacent to the first major cutting edge may be formed at a corner between the long side and the short side of the outer edge of the first end face, a second flank facing the first corner cutting edge may be formed between the first corner cutting edge and the peripheral side surface and have a negative clearance angle with respect to the peripheral side surface, and the second flank may have a corner recess line that extends so as to divide the second flank into two and connects to the recess line.

According to the aspect, the recess line serves as a mark, thereby easily visualizing the progress of the wear of the corner cutting edge. Cutting edges to be used can be replaced by changing the corners at a proper time.

The present invention can provide a cutting insert that is properly manufactured with ease of use.

DETAILED DESCRIPTION

Figure 1:
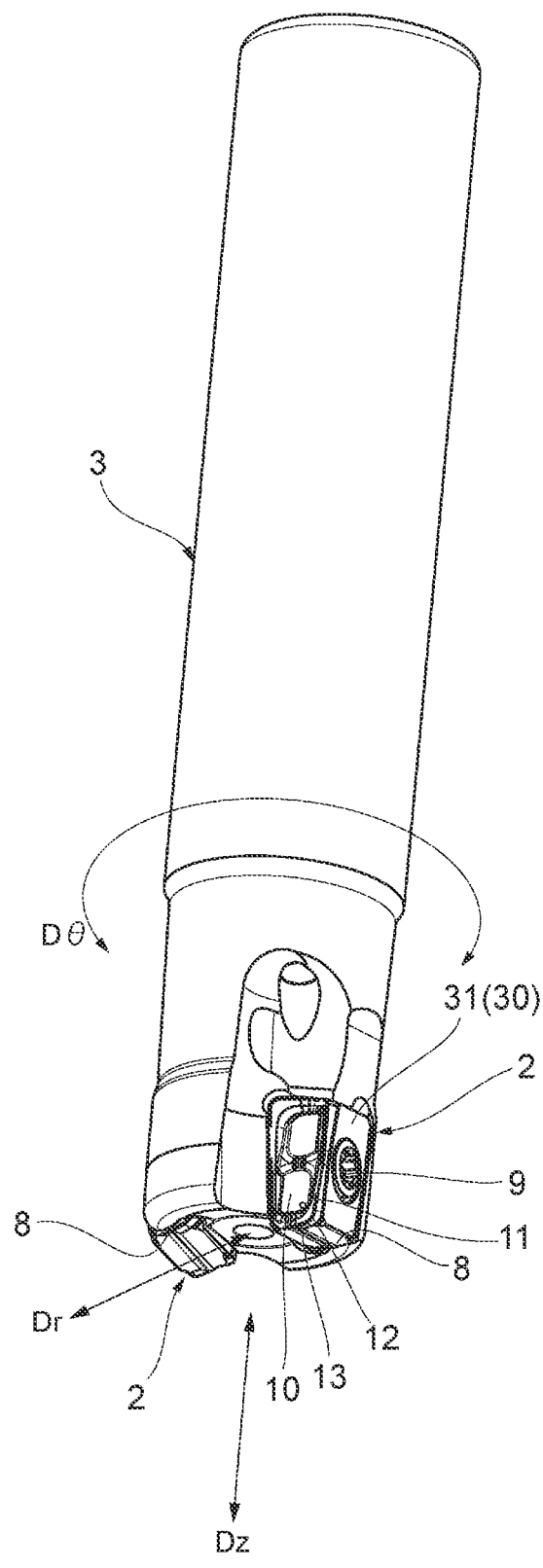
FIG. 1 is a perspective view illustrating an example of a rotating tool according to an embodiment of the present invention.
Figure 3:
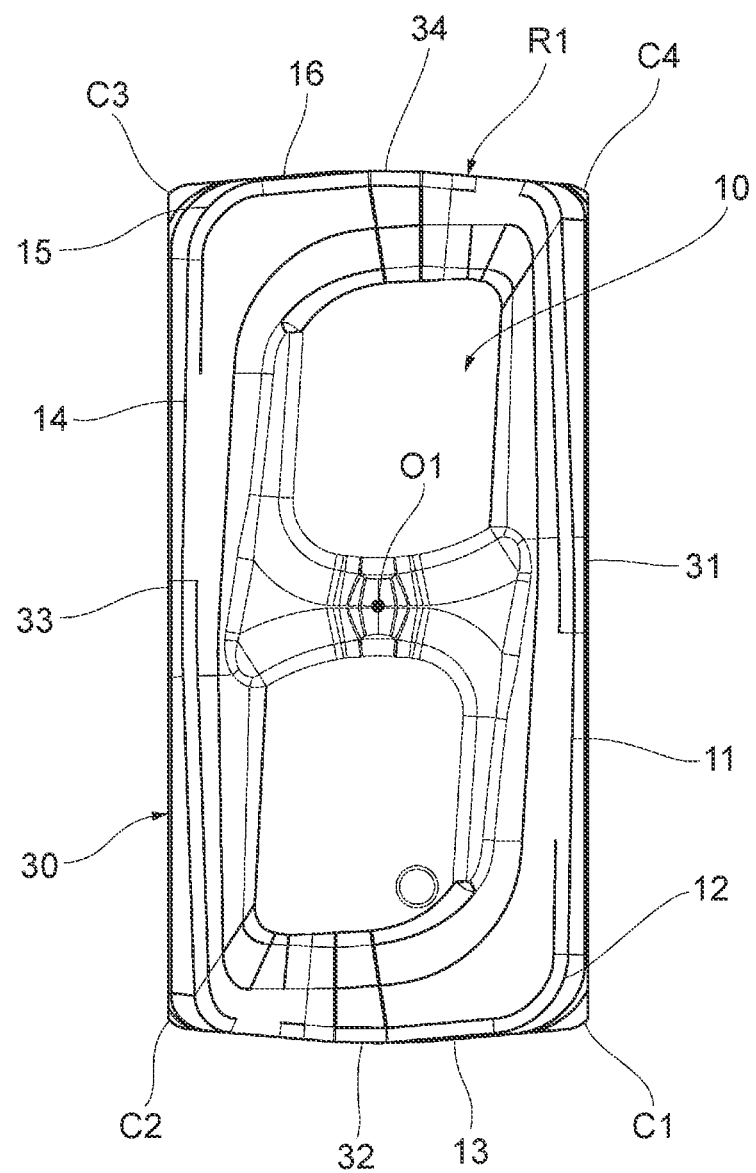
FIG. 3 is a plan view of the cutting insert of FIG. 2, the cutting insert being viewed from a first end face.
Figure 6:
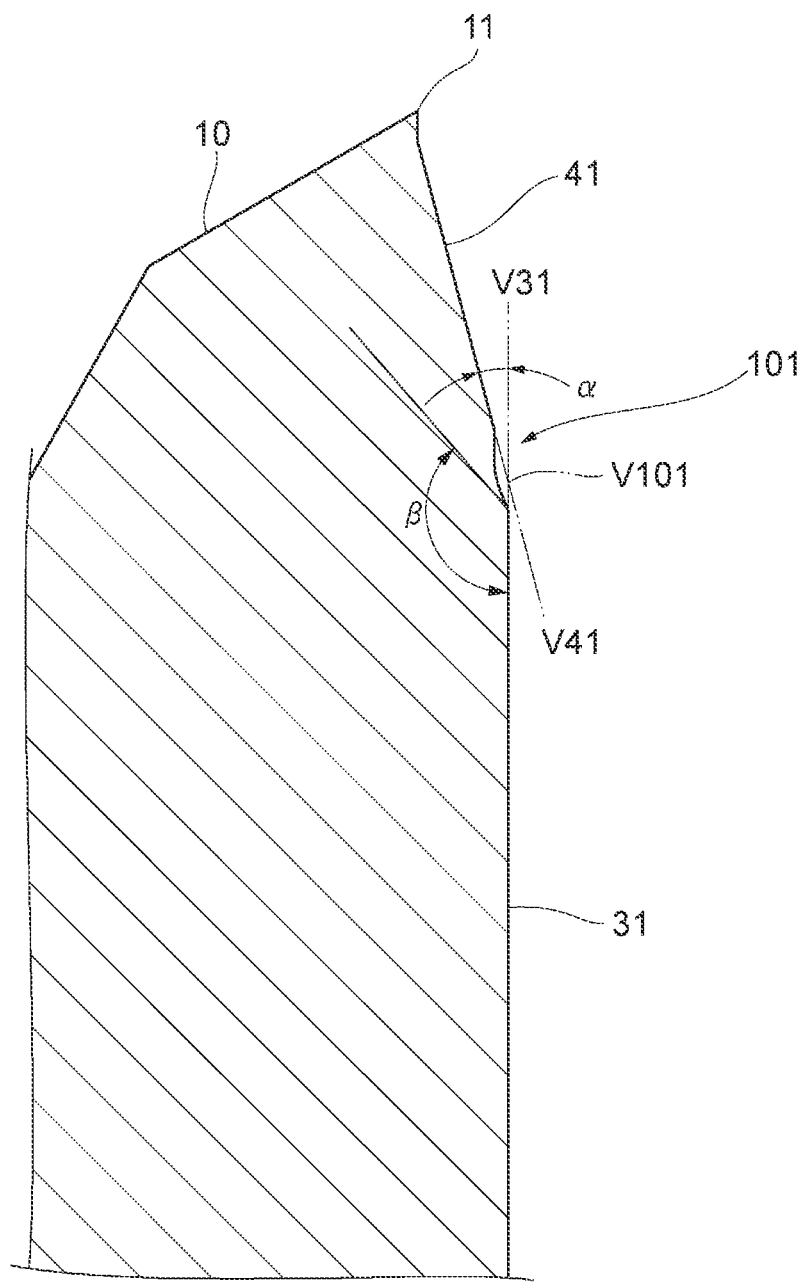
FIG. 6 is a cross-sectional view taken along line VI-VI of FIG. 4.

A preferred embodiment of the present invention will be described below with reference to the accompanying drawings. In the drawings, constituent elements indicated by the same reference numerals have the same or similar configurations. A cutting insert 2 according to an embodiment of the present invention is, for example, a vertical insert suitable for a rotating tool 1 capable of square shoulder milling (FIG. 1). Flanks 41, 44, 51, and 54 facing major cutting edges 11, 14, 21, and 24 are formed in an inverted positive type with a negative clearance angle α with respect to side surfaces 31 and 33 defined on a peripheral side surface 30 (FIGS. 3 and 6).

Figure 4:
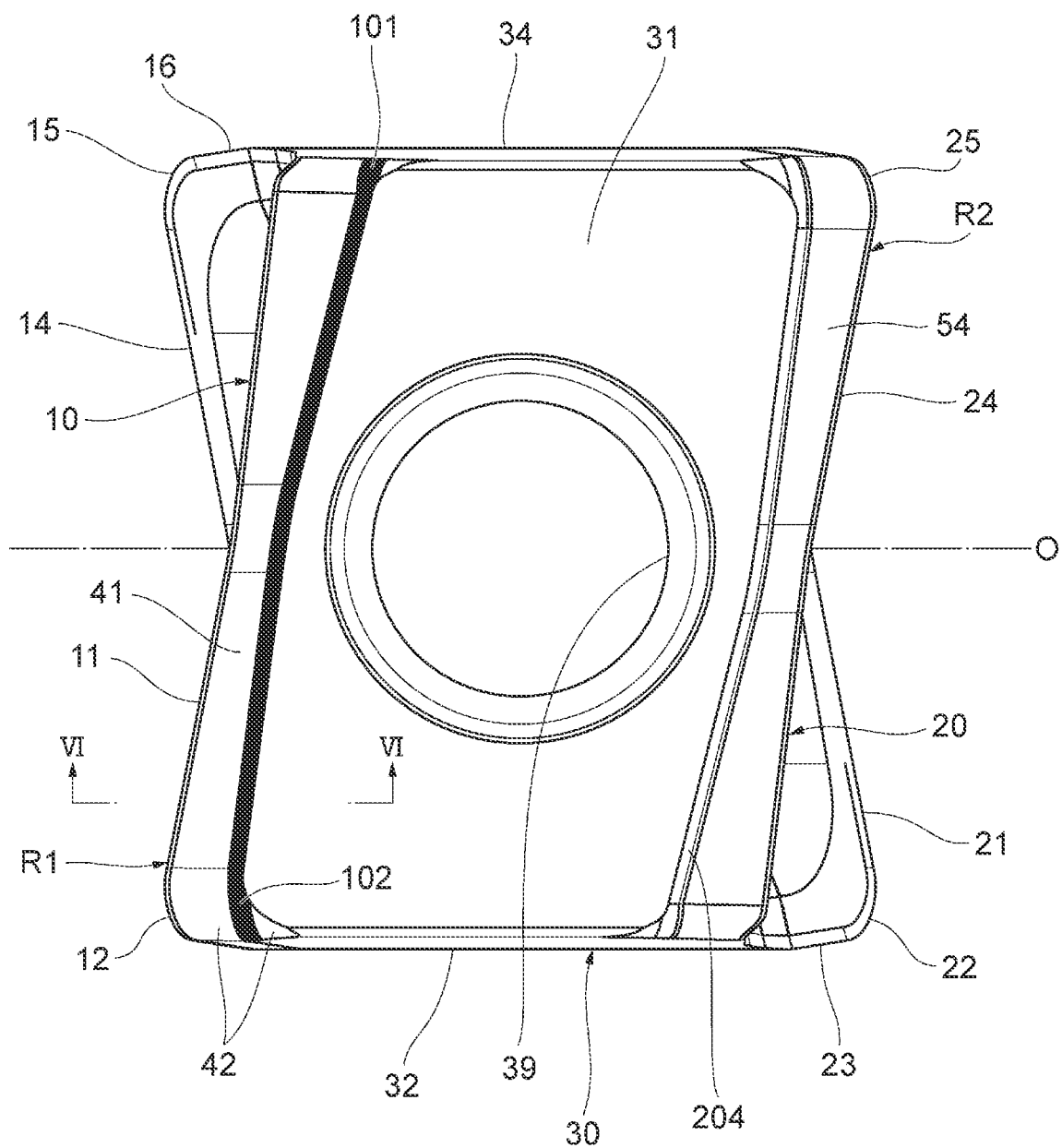
FIG. 4 is a side surface view of the cutting insert of FIG. 2, the cutting insert being viewed from a first side surface.

A feature of the cutting insert 2 of the present embodiment is recess lines 101, 104, 201, and 204 formed between the flanks 41, 44, 51, and 54 and the side surfaces 31 and 33 (FIG. 4). The recess lines 101, 104, 201, and 204 define boundaries between the flanks 41, 44, 51, and 54 and the side surfaces 31 and 33, thereby visualizing the major cutting edges 11, 14, 21, and 24 wearing close to the side surfaces 31 and 33. The areas of the side surfaces 31 and 33 are hardly changed by the depth of grinding on the side surfaces 31 and 33. Referring to FIGS. 1 to 6, the configurations will be described in detail.

FIG. 1 is a perspective view illustrating an example of the rotating tool 1 provided with the cutting inserts 2 according to the embodiment of the present invention. As illustrated in FIG. 1, the rotating tool 1 with replaceable cutting edges includes the replaceable cutting inserts 2 and a tool body 3 fixing the cutting inserts 2. A proximal-end portion including the proximal end of the tool body 3 and the proximity thereof is fixed to a machine tool and is rotated thereon. A distal-end portion including the distal end of the tool body 3 and the proximity thereof has a plurality of insert mounts 8.

The cutting inserts 2 are fixed to the respective insert mounts 8. The insert mount 8 has a mounting surface supporting the cutting insert 2 in a radial direction Dr of the tool body 3, a mounting surface supporting the cutting insert 2 in an axial direction Dz of the tool body 3, and a mounting surface supporting the cutting insert 2 in a circumferential direction De of the tool body 3.

In the illustrated example, the insert mounts 8 are provided at two locations. The number of insert mounts 8 is not particularly limited, and the insert mounts 8 may be provided at one location or three or more locations. In the illustrated example, the tool body 3 has a screw-on configuration in which a clamping screw 9 is inserted into a mounting hole (through hole) 39 to fix the cutting inserts 2 to the insert mounts 8. The cutting insert 2 is configured as a vertical insert in which the mounting hole 39 penetrates the peripheral side surface 30 (first and third side surfaces 31 and 33).

Figure 2:
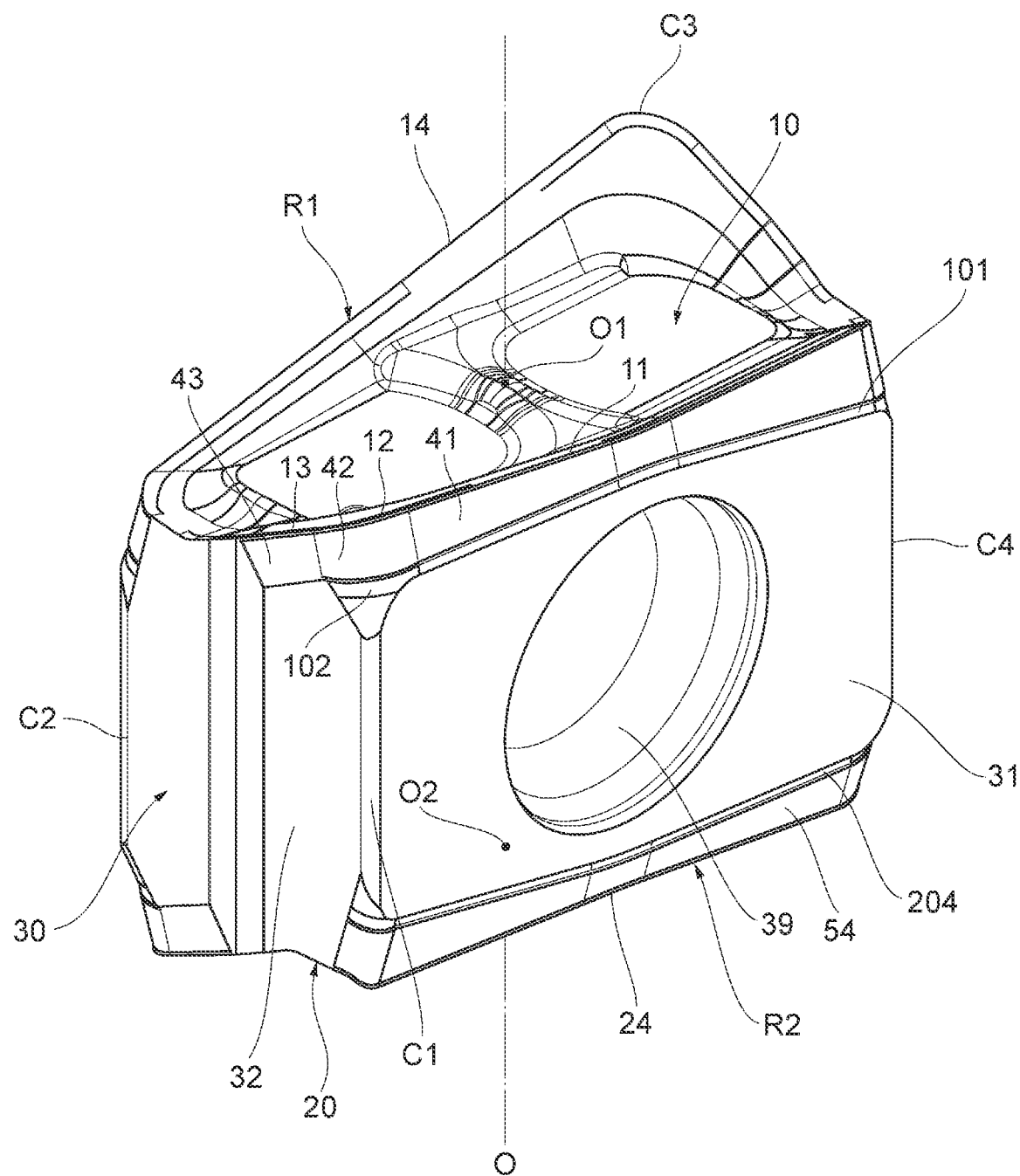
FIG. 2 is a perspective view illustrating an example of a cutting insert according to the embodiment of the present invention.

FIG. 2 is a perspective view illustrating an example of the cutting insert 2 according to the embodiment of the present invention. The material of the cutting insert 2 is not particularly limited. Various materials for cutting inserts, for example, cemented carbide may be applied. As illustrated in FIG. 2, the cutting insert 2 has a first end face 10, a second end face 20 on the opposite side from the first end face 10, and the peripheral side surface 30 connecting the first and second end faces 10 and 20.

In the illustrated example, the first and second end faces 10 and 20 have substantially the same shape and functions. In the rotating tool 1, the first end face 10 may serve as an upper surface for using cutting edges 11 to 16 while the second end face 20 may serve as a lower surface for fixing the second end face 20 to the insert mount 8. Alternatively, the second end face 20 may serve as an upper surface while the first end face 10 may serve as a lower surface. Thus, the first end face 10 will be specifically described as a representative end face. An overlapping explanation of the second end face 20 may be omitted. The first and second end faces 10 and 20 do not always need to be identical in shape. For example, the first end face 10 may be configured specific for an upper surface, whereas the second end face 20 may be configured specific for a lower surface.

In the illustrated example, the first end face 10 has point symmetry being symmetrically at 180° around a center O1. Likewise, the second end face 20 has point symmetry being symmetrically at 180° around a center O2. In the following description, a straight line connecting the center O1 of the first end face 10 and the center O2 of the second end face 20 will be referred to as a central axis O of a cutting face. If the first and second end faces 10 and 20 do not have point symmetry, the centers O1 and O2 serve as, for example, the centers of gravity.

FIG. 3 is a plan view of the cutting insert 2 of FIG. 2, the cutting insert 2 being viewed from the first end face 10. As illustrated in FIG. 3, the cutting insert 2 is shaped like a quadrangular prism extending along the central axis O. The peripheral side surface 30 includes four corners C1, C2, C3, and C4. In the illustrated example, the first end face 10 has a substantially rectangular outer edge R1. The second end face 20 in FIG. 2 has a substantially rectangular outer edge R2 like the outer edge R1 of the first end face 10.

The peripheral side surface 30 includes the first side surface 31, a second side surface 32, the third side surface 33, and a fourth side surface 34. The first and third side surfaces 31 and 33 are formed in parts facing the long sides of the substantially rectangular outer edges R1 and R2. The second and fourth side surfaces 32 and 34 are formed in parts facing the short sides of the substantially rectangular outer edges R1 and R2. The side surfaces 31, 32, 33, and 34 are formed in parallel with the central axis O. The first and third side surfaces 31 and 33 each have a maximum area in the restraint surface in contact with the insert mount 8 and have the mounting hole 39 (FIG. 2) where the clamping screw 9 (FIG. 1) is inserted. Thus, the side surfaces 31 and 33 may be called main restrained surfaces.

At least a part of the outer edge R1 of the first end face 10 has a cutting edge. In the illustrated example, a first major cutting edge 11 is formed on one of the long sides of the outer edge R1 of the first end face 10 while a second major cutting edge 14 is formed on the other long side. The first and second major cutting edges 11 and 14 slightly expand into arc shapes so as to extend away from the central axis O. At the corner C1, a first corner cutting edge 12 adjacent to the first major cutting edge 11 is formed. At the corner C3 diagonal to the corner C1, a second corner cutting edge 15 adjacent to the second major cutting edge 14 is formed. On a part of one of the short sides of the outer edge R1, a first sub-cutting edge 13 adjacent to the first corner cutting edge 12 is formed. On a part of the other short side, a second sub-cutting edge 16 adjacent to the second corner cutting edge 15 is formed.

The configurations of the cutting edges are not limited to those of the illustrated example. For example, the short side of the outer edge R1 of the first end face 10 may further include an inner blade that is disposed inside the first and second major cutting edges 11 and 14 in the radial direction Dr of the tool body 3 and is provided to cut a workpiece material to be cut having not been sufficiently cut by the first and second major cutting edges 11 and 14. In this case, a first inner blade may be formed between the first sub-cutting edge 13 and the second major cutting edge 14, and a second inner blade may be formed between the second sub-cutting edge 16 and the first major cutting edge 11.

For example, the first and second sub-cutting edges 13 and 16 may be configured as flat drags for dragging the finished surface of a workpiece material cut by the first and second major cutting edges 11 and 14 in the radial direction Dr of the tool body 3. In this case, the flanks of the flat drags may be formed substantially in parallel with the finished surface.

FIG. 4 is a side view of the cutting insert 2 of FIG. 2, the cutting insert 2 being viewed from the first side surface 31 on which the mounting hole 39 is formed. The outer edge R2 of the second end face 20 in FIG. 4 includes a third major cutting edge 21, a third corner cutting edge 22, a third sub-cutting edge 23, a fourth major cutting edge 24, a fourth corner cutting edge 25, and a fourth sub-cutting edge 26. The cutting edges and cutting edges 21 to 26 of the outer edge R2 of the second end face 20 have the same shapes and functions as the cutting edges and cutting edges 11 to 16 of the outer edge R1 of the first end face 10.

As illustrated in FIG. 2, the flanks of the cutting edges and cutting edges 11 to 16 each have a negative clearance angle with respect to the peripheral side surface 30 parallel to the central axis O. Likewise, the flanks of the cutting edges and cutting edges 21 to 26 each have a negative clearance angle with respect to the peripheral side surface 30. Specifically, a first flank 41 facing the first major cutting edge 11 has a negative clearance angle with respect to the first side surface 31 constituting the peripheral side surface 30. In other words, the first flank 41 tilts inward from the first major cutting edge 11 to the second major cutting edge 14 opposed to the first major cutting edge 11, in a direction from the second end face 20 to the first end face 10 on the opposite side from the second end face 20.

Likewise, a second flank 42 facing the first corner cutting edge 12 has a negative clearance angle with respect to the corner C1 constituting the peripheral side surface 30. A third flank 43 facing the first sub-cutting edge 13 has a negative clearance angle with respect to the second side surface 32 constituting the peripheral side surface 30. Other flanks also have negative clearance angles with respect to the side surfaces 31 to 34 immediately under the flanks.

As illustrated in FIG. 4, the first flank 41 decreases in width from both ends of the first major cutting edge 11 toward the center of the first major cutting edge 11. The recess line (groove) 101 is formed between the first flank 41 facing the first major cutting edge 11 and the first side surface 31 facing the first flank 41. The recess line 101 and the corner recess line 102, which will be described later, are painted black in FIG. 4. Like the recess line 101, recess lines are formed between the flanks facing the second to fourth major cutting edges 14, 21, and 24 and the side surfaces 31 and 32 facing the flanks.

In parts where the cutting edges and cutting edges 11 to 16 and 21 to 26 are not formed on the outer edges R1 and R2 of the first and second end faces 10 and 20, the peripheral side surface 30 connecting the first and second end faces 10 and 20 extends to the outer edges R1 and R2 of the first and second end faces 10 and 20. In parts where the cutting edges and cutting edges 11 to 16 and 21 to 26 are formed on the outer edges R1 and R2, the peripheral side surface 30 extends near the outer edges R1 and R2. In these parts, the peripheral side surface 30 connects the first end face 10 and the second end face 20 via the flanks and the recess lines immediately under the cutting edges and cutting edges 11 to 16 and 21 to 26.

Figure 5:
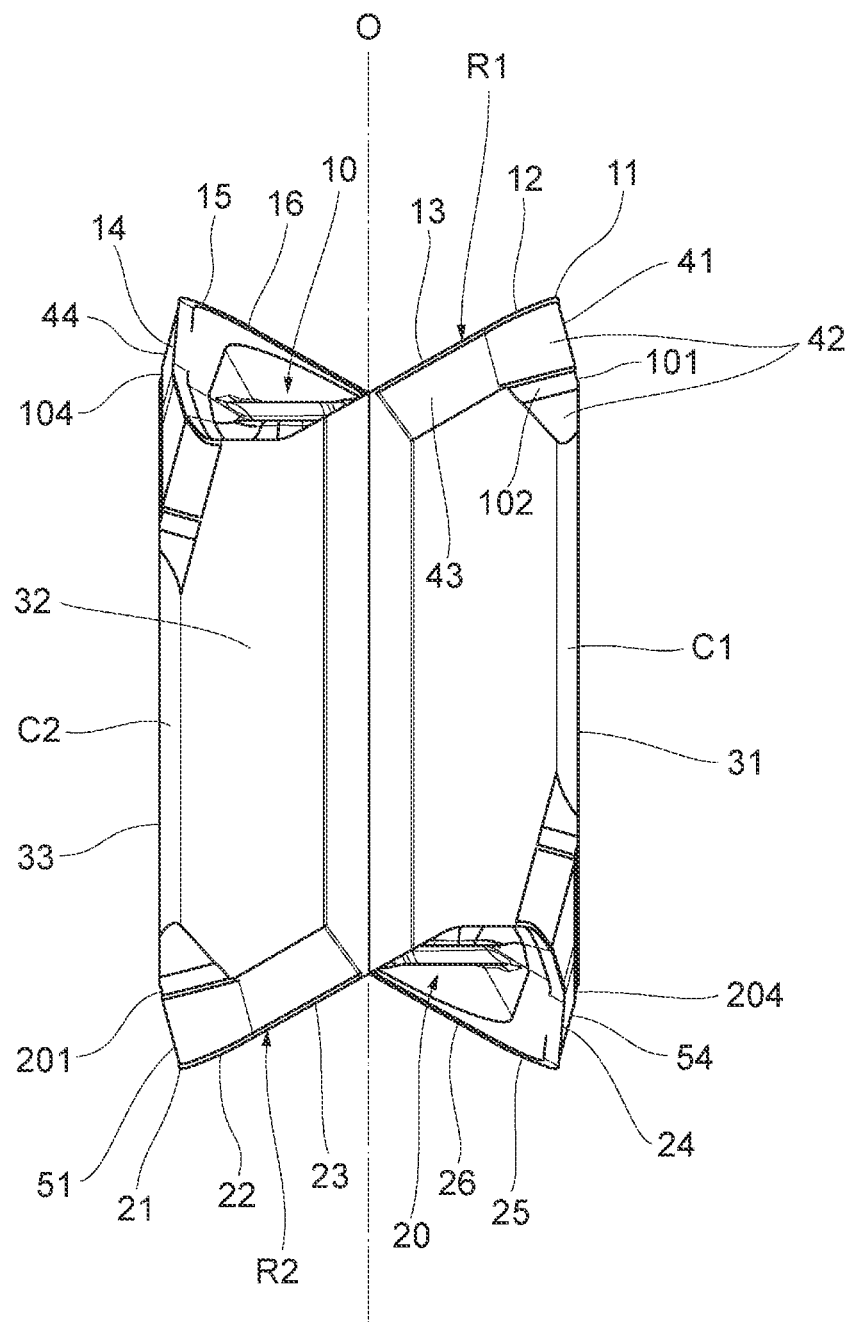
FIG. 5 is a side surface view of the cutting insert of FIG. 2, the cutting insert being viewed from a second side surface.

FIG. 5 is a side view of the cutting insert 2 of FIG. 2, the cutting insert 2 being viewed from the second side surface 32. As illustrated in FIG. 5, the corner recess line 102 connecting to the recess line 101 is formed on the second flank 42 facing the first corner cutting edge 12. The corner recess line 102 extends substantially in parallel with the first corner cutting edge 12 and crosses the second flank 42 so as to divide the second flank 42 into two. The corner recess line 102 is substantially identical in shape to the recess line 101 in cross section.

FIG. 6 is a cross-sectional view taken along line VI-VI of FIG. 4. As illustrated in FIG. 6, the cutting insert 2 of the present embodiment is disposed in an inverted positive type such that the clearance angle $\alpha$ of the first major cutting edge 11 is a negative angle, and a crossing angle between the flank 41 of the first major cutting edge 11 and the first side surface 31 immediately under the flank is small. However, the cutting insert 2 has the recess line 101 that is formed between the first flank 41 and the first side surface 31.

The recess line 101 extends along a virtual edge line V101 where a virtual plane V41 extending from the first flank 41 and a virtual plane V31 extending from the first side surface 31 cross each other, and the recess line 101 is formed with a notch on the virtual edge line V101. The recess line 101 has, for example, a surface curved inward on the cutting insert 2. In other words, the recess line 101 is arc-shaped in cross section. In the illustrated example, the arc of the recess line 101 in cross section has a radius of curvature of 0.25 mm while a crossing angle $\beta$ between the recess line 101 and the first side surface 31 is 135°.

If the arc of the recess line 101 in cross section has a radius of curvature of at least 0.1 mm, the recess line 101 is visible and is unlikely to be removed regardless of the depth of grinding. Even when the depth of grinding on the first side surface 31 is slightly shallow or deep, if the crossing angle $\beta$ ranges from 90° to 140°, variations in the area of the first side surface 31 are so small that the cutting insert can be manufactured with the same tolerance as a cutting insert not disposed in an inverted positive type.

The cutting insert 2 configured according to the present embodiment allows the recess line 101 to define the outline of the first side surface 31 as illustrated in FIG. 6. This can visualize the first major cutting edge 11 wearing close to the restraint surface of the first side surface 31, ensuring the ease of using the cutting insert 2. As described above, in the presence of the recess line 101, the area of the first side surface 31 is less likely to be changed than in the absence of the recess line 101. The tolerance does not need strict management, ensuring the ease of manufacturing the cutting insert 2.

The foregoing embodiment is described to enhance understanding of the present invention but is not described to limit the interpretation of the present invention. The elements provided in the embodiment and the layout, materials, conditions, and sizes of the elements are not limited to those illustrated in the embodiment and thus can be optionally changed. Moreover, configurations in different embodiments can be partially replaced or combined.

What is claimed is:

1. A cutting insert having a first end face, a second end face on an opposite side from the first end face, and a peripheral side surface that is parallel to a central axis and connects the first end face and the second end face, the central axis connecting a center of the first end face and a center of the second end face,
    wherein a first major cutting edge is formed on an outer edge of the first end face,
    a first flank adjacent to the first major cutting edge is formed between the first major cutting edge and the peripheral side surface and has a negative clearance angle with respect to the peripheral side surface,
    the peripheral side surface includes a first side surface adjacent to the first flank, and
    a recess line is formed between the first flank and the first side surface, the recess line extending along a virtual edge line where a virtual plane extending from the first flank and a virtual plane extending from the first side surface cross each other, the recess line being formed with a notch on the virtual edge line.

2. The cutting insert according to claim 1, wherein
    the cutting insert has a mounting hole,
    the cutting insert is configured to be fixed on a tool body as a vertical insert in which the mounting hole penetrates the peripheral side surface,
    the first end face has point symmetry being symmetrically at 180° around the central axis and has a second major cutting edge on the outer edge of the first end face, the second major cutting edge being opposed to the first major cutting edge, and
    the first side surface is configured to be in contact with the tool body during cutting with the second major cutting edge.

3. The cutting insert according to claim 1, wherein the first side surface is ground.

4. The cutting insert according to claim 2, wherein the first side surface is ground.

5. The cutting insert according to claim 1, wherein the first flank decreases in width from both ends of the first major cutting edge toward a center of the first major cutting edge.

6. The cutting insert according to claim 2, wherein the first flank decreases in width from both ends of the first major cutting edge toward a center of the first major cutting edge.

7. The cutting insert according to claim 3, wherein the first flank decreases in width from both ends of the first major cutting edge toward a center of the first major cutting edge.

8. The cutting insert according to claim 4, wherein the first flank decreases in width from both ends of the first major cutting edge toward a center of the first major cutting edge.

9. The cutting insert according to claim 1, wherein the outer edge of the first end face is formed in a substantially rectangular shape,
    the first major cutting edge is located on a long side of the first end face,
    a first corner cutting edge adjacent to the first major cutting edge is formed at a corner between a long side and a short side of the outer edge of the first end face,
    a second flank adjacent to the first corner cutting edge is formed between the first corner cutting edge and the peripheral side surface and has a negative clearance angle with respect to the peripheral side surface, and
    the second flank has a corner recess line that extends so as to divide the second flank into two and connects to the recess line.

10. The cutting insert according to claim 2, wherein the outer edge of the first end face is formed in a substantially rectangular shape,
    the first major cutting edge is located on a long side of the first end face,
    a first corner cutting edge adjacent to the first major cutting edge is formed at a corner between a long side and a short side of the outer edge of the first end face,
    a second flank adjacent to the first corner cutting edge is formed between the first corner cutting edge and the peripheral side surface and has a negative clearance angle with respect to the peripheral side surface, and
    the second flank has a corner recess line that extends so as to divide the second flank into two and connects to the recess line.

11. The cutting insert according to claim 3, wherein the outer edge of the first end face is formed in a substantially rectangular shape,
    the first major cutting edge is located on a long side of the first end face,
    a first corner cutting edge adjacent to the first major cutting edge is formed at a corner between a long side and a short side of the outer edge of the first end face,
    a second flank adjacent to the first corner cutting edge is formed between the first corner cutting edge and the peripheral side surface and has a negative clearance angle with respect to the peripheral side surface, and
    the second flank has a corner recess line that extends so as to divide the second flank into two and connects to the recess line.

12. The cutting insert according to claim 4, wherein the outer edge of the first end face is formed in a substantially rectangular shape,
    the first major cutting edge is located on a long side of the first end face,
    a first corner cutting edge adjacent to the first major cutting edge is formed at a corner between a long side and a short side of the outer edge of the first end face,
    a second flank adjacent to the first corner cutting edge is formed between the first corner cutting edge and the peripheral side surface and has a negative clearance angle with respect to the peripheral side surface, and
    the second flank has a corner recess line that extends so as to divide the second flank into two and connects to the recess line.

13. The cutting insert according to claim 5, wherein the outer edge of the first end face is formed in a substantially rectangular shape, the first major cutting edge is located on a long side of the first end face, a first corner cutting edge adjacent to the first major cutting edge is formed at a corner between a long side and a short side of the outer edge of the first end face, a second flank adjacent to the first corner cutting edge is formed between the first corner cutting edge and the peripheral side surface and has a negative clearance angle with respect to the peripheral side surface, and the second flank has a corner recess line that extends so as to divide the second flank into two and connects to the recess line.

14. The cutting insert according to claim 6, wherein the outer edge of the first end face is formed in a substantially rectangular shape, the first major cutting edge is located on a long side of the first end face, a first corner cutting edge adjacent to the first major cutting edge is formed at a corner between a long side and a short side of the outer edge of the first end face, a second flank adjacent to the first corner cutting edge is formed between the first corner cutting edge and the peripheral side surface and has a negative clearance angle with respect to the peripheral side surface, and the second flank has a corner recess line that extends so as to divide the second flank into two and connects to the recess line.

15. The cutting insert according to claim 7, wherein the outer edge of the first end face is formed in a substantially rectangular shape, the first major cutting edge is located on a long side of the first end face, a first corner cutting edge adjacent to the first major cutting edge is formed at a corner between a long side and a short side of the outer edge of the first end face, a second flank adjacent to the first corner cutting edge is formed between the first corner cutting edge and the peripheral side surface and has a negative clearance angle with respect to the peripheral side surface, and the second flank has a corner recess line that extends so as to divide the second flank into two and connects to the recess line.

16. The cutting insert according to claim 8, wherein the outer edge of the first end face is formed in a substantially rectangular shape, the first major cutting edge is located on a long side of the first end face, a first corner cutting edge adjacent to the first major cutting edge is formed at a corner between a long side and a short side of the outer edge of the first end face, a second flank adjacent to the first corner cutting edge is formed between the first corner cutting edge and the peripheral side surface and has a negative clearance angle with respect to the peripheral side surface, and the second flank has a corner recess line that extends so as to divide the second flank into two and connects to the recess line.

\* \* \* \* \*